Patented Aug. 3, 1943

2,325,963

UNITED STATES PATENT OFFICE 2,325,963

THERMOPLASTIC ADHESIVE COMPOSITION de Forest Lott, Henry Grinsfelder, and Edward G. Hamway, Toledo, Ohio, assignors to Textileather Corporation, Toledo, Ohio, a corporation of Delaware No Drawing. Application July 5, 1940,
Serial No. 344,074

7 Claims. (Cl. 260—23)

This invention relates to thermoplastic adhesives and more especially to those of a character adapted for use in mending or reinforcing fabrics or other flexible materials.

The invention has for an object the provision of a thermoplastic material upon a fabric base in such a manner that the fabric base may be united to another fabric or flexible material through the application of heat and comparatively light pressure.

My invention is inclusive of a thermoplastic adhesive coating for a base material which may be applied by the conventional calendering methods or may be applied through the use of a suitable solvent; the thermoplastic coating comprising copolymer resins, such as vinyl chloride and vinyl acetate, plasticizing agents and a stabilizer, to the exclusion of simple polymers.

My invention has for an object the provision of a thermoplastic impregnated fabric particularly adaptable as a mending tissue or tape, which may be affixed to another fabric or flexible material by the use of heat and pressure and which will withstand laundering or dry-cleaning under the usual procedures or formulas without discoloration or loosening of the thermoplastic adhesive from the fabric upon which it is applied.

Another object of the invention is the provision of a thermoplastic composition applied to a fabric base or to another fibre or cellulose base which when subjected to relatively light pressure and heat through the means employed in the conventional laundering or dry-cleaning pressing machinery or hand iron will cementitiously mend tears, snags or holes in such articles, for example, as shirts, bed linen, towels, aprons, woolen or rayon fabrics, silks and the like, and thus provide an inexpensive yet quickly applied permanent mend.

Another object of this invention is the provision of a thermoplastic mending tissue embodying a thermoplastic composition of a character which will remain extremely flexible and pliable after the application of the mending tissue to the fabric to be mended. The thermoplastic composition employed is such that even though the mending tissue becomes slightly loosened from the fabric by immersion in hot laundering solutions, the tissue upon the subsequent application of ironing heat is immediately "reset" and does not become discolored through repeated laundering operations and always remains extremely flexible and pliable.

The thermoplastic composition or compositions with which we coat or impregnate a fabric base includes conjointly polymerized resins of vinyl acetate and vinyl chloride, a plasticizing agent or agents and a suitable stabilizer. A preferred formula of such composition for application to a base fabric as by calendering, i. e., without a solvent is as follows:

Example 1

| | Parts by weight |
|---|---|
| A copolymer resin having 87% vinyl chloride and 13% vinyl acetate | 70 |
| Dibutoxy ethyl phthalate | 25 |
| Butoxy ethyl stearate | 5 |
| Calcium stearate | 1.4 |

It is to be understood that as to the composite polymer resin, the proportions of the conjointly polymerized vinyl acetate and vinyl chloride may be varied within reasonable limits without departing from the invention; and that the amount, character and type of plasticizing agents and stabilizer may also be varied within reasonable limits without departing from the invention.

We have found that a copolymer resin of from 77% to 97% of vinyl chloride and 23% to 3% vinyl acetate may be utilized as the resin constituent of the composition, but that we prefer to use from 85% to 87% vinyl chloride and 13% to 15% vinyl acetate making up the copolymer resin constituent of the composition.

In Example 1, we have specified as a plasticizing agent twenty-five parts dibutoxy ethyl phthalate and five parts of butoxy ethyl stearate as preferred, but these proportions and types of plasticizers may be varied within reasonable limits to suit individual requirements and obtain a high degree of permanent pliability. We have found that calcium stearate is a preferred stabilizer and that the proportions of this ingredient may be varied from 1 to 3 parts by weight of the total composition. The amount of calcium stearate set forth in Example 1 gives excellent results. It is to be understood that we contemplate the use of other stearates of alkaline metals as stabilizers as being within the scope of the invention.

The above composition containing no solvent is applied to the fabric base by heating the composition material to between 225° and 325° F. and is then calendered upon the fabric by means of a conventional calendering machine.

If it is desired to coat the fabric by means of a solution, the following example we have found to be very satisfactory.

| | Parts by weight |
|---|---|
| Copolymer resin having 87% vinyl chloride and 13% vinyl acetate | 31 |
| Dibutoxy ethyl phthalate | 11 |
| Butoxy ethyl stearate | 2 |
| Calcium stearate | 1 |
| Methyl ethyl ketone | 55 |

The above solution using methyl ethyl ketone as a solvent in the example given provides a proper viscosity for coating the base fabric by doctor blade or other conventional spreading methods. It is to be understood that the amount of solvent may be varied or any other suitable solvent used as the solvent per se is evaporated from the solution after its application to the base fabric and performs no important function in the final result after the composition has been applied to the base fabric. It is to be noted that through further reduction in viscosity by adding more solvent, the composition may be applied by spraying methods. The plasticizers as above specified in the typical examples are of a character functioning to make the coated fabric as flexible as possible so that it will remain soft and pliable, yet which will substantially retain its original pliability through repeated laundering or dry-cleaning operations when the fabric is used as a mending tape affixed to other materials. It is to be understood, however, that while the plasticizers as specified in the examples are preferred, others may be satisfactorily used, such for example as dibutyl phthalate, tricresyl phosphate or other suitable plasticizing agents which have a boiling point substantially above 250° F. We have also found that within the range of proportions of the copolymer vinyl resin to the plasticizers may be varied within reasonable limits and yet retain in the final product a permanency of pliability and flexibility suitable for use as a washable mending tissue or tape.

In the application of the thermoplastic adhesive composition we have found that the amount of solids, that is the entire composition of Example 1 and the composition of Example 2 exclusive of the solvent, depends to a large extent upon the weight of the base fabric. Thus, a base fabric suitable for use in mending shirts, tablecloths, sheets of linen or other capable material require less adhesive composition than a heavier base fabric for use in mending comparatively heavy or high pile fabrics as for example, blankets, overcoat material and the like. We have found that between one and one-half to eight ounces applied per square yard of base fabrics provides a satisfactory coating and for the lighter weight base fabric tape the preferred amount of the composition is three and one-half ounces to the square yard. We have found that on heavier base fabrics the amount of the adhesive composition for satisfactory use is between five and eight ounces per square yard. The composition of our invention may be applied to either sized or unsized base material. Where it is desired to mend colored fabrics with the tape of our invention the base material having thermoplastic adhesive composition may include dyes and color pigments or the composition may be tinted or colored without impairing the adhesive properties of the mending material.

This invention has particular utility in laundries for application to and mending rips or breaks in materials. The mending tissue or tape may be affixed under the temperature and pressure of a normal hand iron or of the conventional pressing machinery or mangles now employed in the laundry industry. As a typical example when it is desired to apply the mending tape to a fabric to be mended a portion of the tape may be severed from a supply, placed upon the fabric to be mended and pressed under normal pressure by a hand iron which has been heated to pressing heat of approximately 350° F. or under such temperature and pressure as will cause the thermoplastic coating on the mending tissue to become plastic or semi-fluid and upon cooling become bonded to the threads of the fabric to be mended, and will maintain its adhesive characteristics at temperatures below 212° F. Thus, the applied mending tape will withstand normal launderings and dry-cleaning operations and substantially retain its original high degree of flexibility which is one of the major advantages obtained through the use of the present invention. Moreover, the thermoplastic coating on the mending tissue or on the mended material will not become substantially discolored through repeated laundering or cleaning operations.

It is apparent that, within the scope of the invention, modifications and different arrangements may be made other than is herein disclosed, and the present disclosure is illustrative merely, the invention comprehending all variations thereof.

What we claim is:

1. An article of manufacture for union with fibrous material and the like comprising a fabric base having thereon a film of thermo-fusible material composed of a composite polymer of vinyl chloride and vinyl acetate, a plasticizer composed of a mixture of dibutoxy ethyl phthalate and butoxy ethyl stearate, and a stabilizer of calcium stearate.

2. A mending tissue comprising a base fabric having a coating thereon composed of 70 parts by weight of composite polymer of vinyl chloride and vinyl acetate admixed with 25 parts dibutoxy ethyl phthalate, 5 parts butoxy ethyl stearate and 1.4 parts calcium stearate.

3. An article of manufacture for union with textile material and the like comprising a fibrous base having thereon a film of thermo-fusible material composed of a conjoint polymer including substantially 87% of vinyl chloride with substantially 13% of vinyl acetate; a stabilizer of calcium stearate; and a substantial amount of plasticizing agent composed of a mixture of dibutoxy ethyl phthalate and butoxy ethyl stearate.

4. A thermo-plastic composition comprising substantially 70 parts by weight of a copolymer resin which is composed of a mixture having 77 to 97% vinyl chloride and from 23 to 3% of vinyl acetate; and substantially 30 parts by weight of plasticizing agent of a mixture of dibutoxy ethyl phthalate and butoxy ethyl stearate; and between 1 to 3 parts by weight of a stabilizer of alkali metal stearate.

5. An article of manufacture for union with textile material and the like comprising a fibrous base having thereon a film of a thermo-fusible material composed of a conjoint polymer of vinyl chloride and vinyl acetate; a stabilizer of calcium stearate; and a substantial amount of plasticizing agent consisting of dibutoxy ethyl phthalate and butoxy ethyl stearate which will substantially maintain the composition in a soft pliable condition through repeated laundering or dry cleaning operations.

6. A mending tissue having thermoplastic characteristics including a fibrous base, a film on said fibrous base composed of 70 parts by weight of a vinyl resin having as its constituents from 77% to 97% of vinyl chloride and from 3% to 23% of vinyl acetate, 30 parts by weight of a plasticizer comprising a mixture of dibutoxy ethyl phthalate and butoxy ethyl stearate, and 1 to 3 parts by weight of a stearate of an alkali metal forming a stabilizer.

7. A thermoplastic composition comprising a vinyl resin making up 70 parts by weight of the composition, said vinyl resin composed of from 77% to 97% of composite polymer of vinyl chloride and 23% to 3% of vinyl acetate, 30 parts by weight of a plasticizer composed of a mixture of dibutoxy ethyl phthalate and butoxy ethyl stearate, and substantially 1.4 parts by weight of calcium stearate forming a stabilizer.

DE FOREST LOTT.
HENRY GRINSFELDER.
EDWARD G. HAMWAY.